Jan. 30, 1968   C. J. WILSON   3,366,950

DISPLAY PROJECTION APPARATUS EMPLOYING HALF SILVERED MIRROR

Filed Sept. 21, 1965

INVENTOR.
CORNELIUS J. WILSON
BY
*Arthur H. Swanson*
ATTORNEY.

United States Patent Office 3,366,950
Patented Jan. 30, 1968

3,366,950
DISPLAY PROJECTION APPARATUS EMPLOYING HALF SILVERED MIRROR
Cornelius J. Wilson, East Greenwich, R.I., assignor to Honeywell Inc., Minneapolis, Minn., a corporation of Delaware
Filed Sept. 21, 1965, Ser. No. 488,895
4 Claims. (Cl. 340—378)

This invention relates to data-handling devices. More specifically, the present invention relates to data readout apparatus.

An object of the present invention is to provide an improved data display means.

Another object of the present invention is to provide an improved digital display means having a selective condition characterization of a displayed digital character.

A further object of the present invention is to provide an improved analog display means including condition display means for characterizing an analog element.

Still another object of the present invention is to provide an improved display means having a combined primary and secondary display.

A still further object of the present invention is to provide an improved display means having a facility for altering the characterization of the display and for providing either an analog or digital display.

In accomplishing these and other objects, there has been provided, in accordance with the present invention, a display apparatus comprising primary display device for projecting an illuminated display on a half-silvered mirror for viewing by an operator and a secondary display means positioned behind the mirror to provide a secondary display to be combined with the primary display when the secondary means is illuminated.

A better understanding of the present invention may be had when the following detailed description is read in connection with the accompanying drawings, in which.

Figure 1:
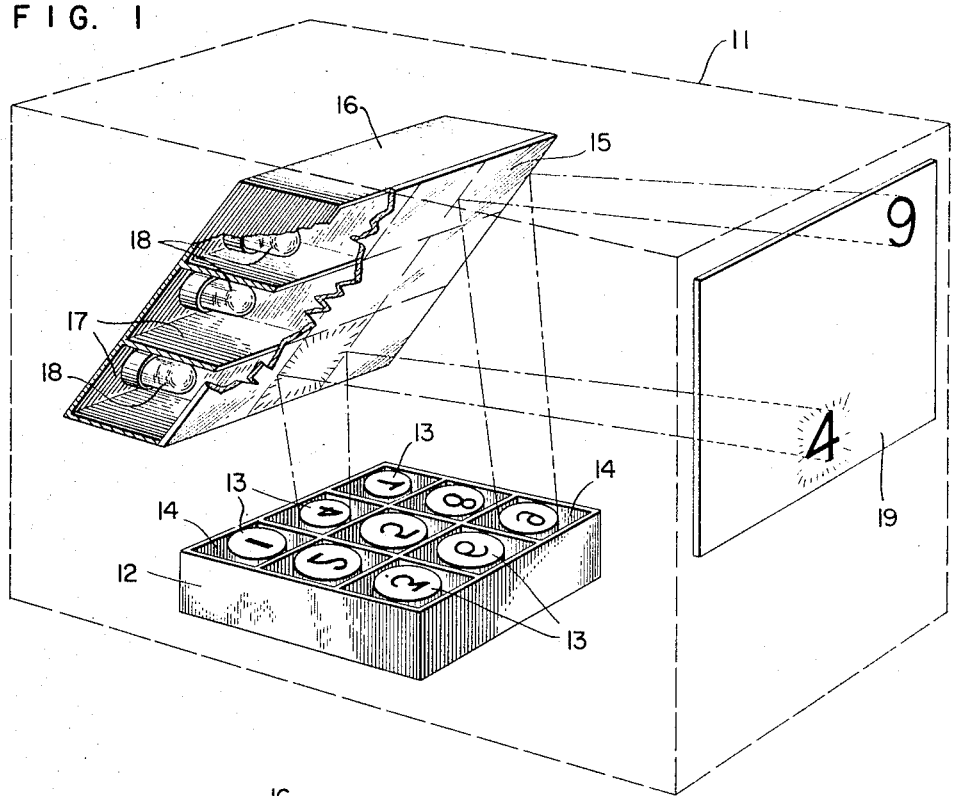
FIG. 1 is a pictorial representation of a data readout system embodying the present invention.

Referring to FIG. 1 in more detail, there is shown a data readout system having a light-tight enclosure 1 housing the system components. Within the enclosure 11, a set of information projectors 12 is arranged to project an image of the data to be viewed, e.g., numbers. The projectors 12 may be individual devices 13 which are arranged to selectively project any one of a number of available symbols, such devices being well-known in the art. The devices 13 may be located in individual compartments 14 to prevent interaction therebetween. The projectors 12 are arranged to project the aforesaid symbols in an optical system including a half-silvered mirror 15. The mirror 15 is arranged as the front face of light-tight enclosure 16 having a plurality of individual compartments 17. These compartments are arranged to house individually illuminable bulbs 18. These bulbs 18 may be provided with either a filter system to provide a colored light output, e.g., red, or a symbol which is made visible when a corresponding bulb is illuminated. The compartments 17 and 18 are arranged to be aligned with respective ones of the projected symbols from the projectors 12 on the face of the mirror 15. After leaving the mirror 15, the projected symbols are allowed to fall upon a viewing window 19 in the front of the system enclosure 11. A normal projection of a symbol such as the "7" shown on the window 16 may be viewed by an operator as an indication of the illuminated condition of the projecting device 13 and the symbol selected thereon. An illumination of a bulb 18 and a projecting device 13 is effective to provide distinctive symbols in combination with another effect such as a symbol "2" outlined with a red background.

Figure 2:
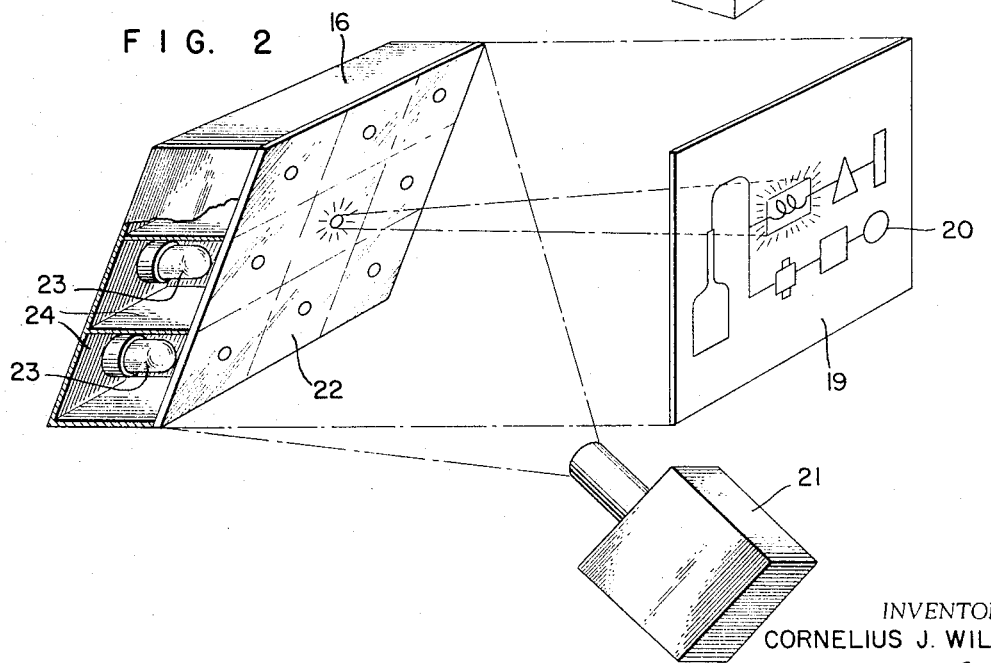
FIG. 2 is a pictorial showing of a modification of the apparatus shown in FIG. 1 also embodying the present invention.

In FIG. 2, there is shown a modification of the apparatus shown in FIG. 1 for providing on the viewing window 19 a plan 20, or picture analog, of a process which is to be monitored. The plan is projected by a projector 21 against a half-silvered mirror 22 having a plurality of bulbs 23 located in individual light-tight compartments 24 behind it as shown in FIG. 1. The illumination of one of the bulbs 23 is effective to produce a combined effect on the window 19 along with the projected plan 20 to characterize a particular element of the process.

In operation, the readout device of the present invention is arranged to provide a selective readout operation for a primary and a secondary display. Thus, the projectors 12 and 20 may be used to provide a primary display pattern at the viewing window 19. The secondary display is provided by the illuminated elements in the box 16. The bulbs 23 are effective to shine through the half-silvered mirror 15 to provide a combined display at the viewing window 19. In the embodiment shown in FIG. 1, the primary digital display may comprise either test points being monitored or digital values of process variables with the secondary display being effective to provide an alarm indication for the operator's information. In the embodiment of FIG. 2, the projected panoramic plan 20 would be combined with a secondary display from box 16 to provide additional data on the components shown in the plan 20. It is to be noted that the projected primary analog display may be a slide in the projector 21 which may be sequentially replaced with another slide while the secondary display is synchronized therewith.

Accordingly, it may be seen that there has been provided, in accordance with the present invention, a display apparatus for providing a combined primary and secondary display with a facility for coordinating the displays while allowing changes to be made in either display without interrupting the other.

What is claimed is:
1. A display means comprising a primary display means arranged to project a primary display composed of a plurality of elements, a half-silvered mirror arranged to reflect said primary display, and a secondary display means arranged behind said mirror to project a secondary display through said mirror to combine with said primary display whereby to characterize elements of said primary display.

2. A display means as set forth in claim 1 wherein said primary display comprises a plurality of individual digital data display devices.

3. A display means as set forth in claim 1 wherein said primary display comprises a projector arranged to project a composite analog picture of a predetermined plan.

4. A display means as set forth in claim 1 wherein said secondary display means comprises a plurality of light-tight boxes mounted on said mirror and having individually illuminable elements therein, said boxes each being arranged with a light exit in a box side touching the mirror.

No references cited.

THOMAS B. HABECKER, *Acting Primary Examiner.*

H. I. PITTS, *Assistant Examiner.*